(12) United States Patent
Oulu et al.

(10) Patent No.: US 6,792,460 B2
(45) Date of Patent: Sep. 14, 2004

(54) SYSTEM AND METHODS FOR MONITORING APPLICATION SERVER PERFORMANCE

(75) Inventors: Yossi Oulu, Yehud (IL); Pinhas Mogilevsky, Rishon-Le-Zion (IL); Ido Sarig, Palo Alto, CA (US)

(73) Assignee: Mercury Interactive Corporation, Mountain View, CA (US)

( * ) Notice: Subject to any disclaimer, the term of this patent is extended or adjusted under 35 U.S.C. 154(b) by 0 days.

(21) Appl. No.: 10/348,203

(22) Filed: Jan. 20, 2003

(65) Prior Publication Data
US 2004/0068560 A1 Apr. 8, 2004

Related U.S. Application Data

(60) Provisional application No. 60/415,697, filed on Oct. 2, 2002.

(51) Int. Cl.[7] ............................................... G06F 11/30
(52) U.S. Cl. ...................... 709/224; 717/130; 717/124; 714/35
(58) Field of Search ............................. 714/47, 25, 35; 709/105, 224; 717/124, 130

(56) References Cited

U.S. PATENT DOCUMENTS 5,303,166 A 4/1994 Amalfitano et al.
5,781,449 A 7/1998 Rosborough (List continued on next page.)

OTHER PUBLICATIONS

Bryan M. Cantrill et al.; ThreadMon: A Tool for Monitoring Multithreaded Program Performance; Proceedings of the Thirtieth Hawaii Internation Conference on System Sciences, 1997; pp. 253–265; Jan. 1997.*

(List continued on next page.)

*Primary Examiner*—Kenneth R. Coulter
(74) *Attorney, Agent, or Firm*—Knobbe, Martens, Olson & Bear LLP

(57) ABSTRACT

A monitoring system monitors the amount of time spent by specific application components, such as Java components, during execution of specific web site transactions. A probe that runs on an application server initially instruments these components (preferably at component load time) to add code for tracking execution start and stop times. When a monitored transaction is executed by the application server, the probe measures the execution times of the invoked components—preferably at the component method level. The resulting measurement data is reported to a reports server, and is used to provide transaction-specific breakdowns of the amount of time spent by each instrumented component, and optionally each instrumented method within such components. In one embodiment, the probe only monitors transactions initiated by agent-generated transaction request messages that are marked or "colored" for monitoring, and thus ignores transactions initiated by actual users.

17 Claims, 11 Drawing Sheets

U.S. PATENT DOCUMENTS

| | | | |
|---|---|---|---|
| 5,918,004 | A | 6/1999 | Anderson et al. |
| 6,006,260 | A | 12/1999 | Barrick, Jr. et al. |
| 6,108,700 | A | 8/2000 | Maccabee et al. |
| 6,157,618 | A | 12/2000 | Boss et al. |
| 6,202,199 | B1 | 3/2001 | Wygodny et al. |
| 6,205,413 | B1 | 3/2001 | Bisdikian et al. |
| 6,216,237 | B1 * | 4/2001 | Klemm et al. ............... 714/38 |
| 6,362,836 | B1 * | 3/2002 | Shaw et al. ................. 345/744 |
| 6,411,998 | B1 | 6/2002 | Bryant et al. ............... 709/224 |
| 6,446,028 | B1 | 9/2002 | Wang |
| 6,449,739 | B1 | 9/2002 | Landan |
| 6,457,142 | B1 | 9/2002 | Klemm et al. |
| 6,584,501 | B1 * | 6/2003 | Cartsonis et al. ........... 709/224 |
| 6,654,949 | B1 * | 11/2003 | Fraenkel et al. ............ 717/130 |
| 6,658,471 | B1 * | 12/2003 | Berry et al. ................. 709/224 |
| 6,658,654 | B1 * | 12/2003 | Berry et al. ................. 717/131 |
| 2002/0062369 | A1 | 5/2002 | Von Klopp et al. |
| 2002/0065911 | A1 | 5/2002 | Von Klopp et al. |
| 2002/0170036 | A1 * | 11/2002 | Cobb et al. ................. 717/130 |
| 2002/0198985 | A1 | 12/2002 | Fraenkel et al. |
| 2003/0061265 | A1 * | 3/2003 | Maso et al. ................. 709/105 |
| 2003/0065986 | A1 * | 4/2003 | Fraenkel et al. ............. 714/47 |
| 2003/0229554 | A1 * | 12/2003 | Veres et al. .................. 705/35 |
| 2004/0015936 | A1 * | 1/2004 | Susarla et al. .............. 717/166 |

OTHER PUBLICATIONS

Kevin S. Templer et al.; A Configurable Automatic Instrumentation Tool for ANSI C; 13th IEEE International Conference on Automated Software Engineering, 1998; pp. 249–258; Oct. 1998.*

Jong–Deok Choi et al.; A Perturbation–Free Replay Platform for Cross–Optimized Multithreaded Applications; 15th International Parallel and Distributed Processing Symposium; Apr. 2001.*

Thirty–eight page Document titled "Java Virtual Machine Profiler Interface (JVMPI)," downloaded from http://java.sun.com/products/jdk/1.2/docs/guide/jvmpi/jvmpi.html; having a "last modified" date as Feb. 3, 2000.

V. Mainkar, "Availability Analysis of Transaction Processing Systems based on User–Perceived Performance" IEEE Computer, pp. 10–17 (1997).

* cited by examiner

SYSTEM AND METHODS FOR MONITORING APPLICATION SERVER PERFORMANCE

RELATED APPLICATIONS

This application claims the benefit of U.S. Provisional Appl. No. 60/415,697, filed Oct. 2, 2002.

BACKGROUND OF THE INVENTION

1. Field of the Invention

The present invention relates to software tools and services for testing and monitoring the operation of web-based and other server systems.

2. Description of the Related Art

A variety of commercially-available systems exist for allowing companies to monitor the post-deployment performance of their web sites and other server systems. For example, Mercury Interactive Corporation, the assignee of the present application, operates a hosted service that allows customers to monitor their respective web sites as seen by end users in various geographic locations. Web site and server monitoring systems are also available as products that may be installed and operated "in house." Various tools and services also exist for allowing web site operators to load-test and functionality-test their applications and server systems prior to deployment.

One problem with existing monitoring systems is that the web site performance data they collect and report typically fails to reveal the specific application components that are the sources of slow response times seen by end users. Without such information, web site operators and developers may have to resort to tedious experimentation to identify the root causes of application-related performance problems. The present invention addresses this problem.

SUMMARY OF THE INVENTION

The present invention provides a monitoring system that monitors the amount of time spent by specific application components, such as Java components, during execution of specific transactions on a web site or other server system. A probe that runs on an application server initially instruments these application components (preferably at component load time) to add code for tracking execution start and stop times. When a monitored transaction is executed by the application server, the probe measures the execution times of the invoked components—preferably at the component method level. The resulting measurement data is reported to a reports server, and is preferably used to provide transaction-specific breakdowns of the amount of time spent by each instrumented component, and optionally each instrumented method within such components.

For example, a breakdown report may indicate the amount of time spent by each servlet, Java Server Page, entity EJB (Enterprise JavaBean), and session EJB invoked by a particular transaction, such as a "login" or "place order" transaction. This data may in turn be used by an operator to determine which components or component types are the sources of application performance problems. The breakdown data may optionally be presented in conjunction with associated transaction response times (as measured, e.g., by client-side agent computers), so that an operator can assess the impact each application component has on response times seen by end users. A report may also be provided that further breaks down the component-level execution times by method, so that developers can identify the specific methods that are the sources of performance problems.

In one embodiment, the probe only monitors transactions initiated by agent-generated transaction request messages that are marked or "colored" for monitoring. Transactions initiated by actual users are thus ignored, as may be desirable to avoid unduly limiting the performance of the application server. In another embodiment, the probe additionally or alternatively monitors transactions initiated by real users, such as all requests for specific URLs (Uniform Resource Locators).

To instrument Java application components in one embodiment, a patch is initially added to the class loader component of a Java virtual machine installed on the application server. This patch causes the class loader component to pass Java components to an instrumentation component at load time. The Java virtual machine may alternatively be configured, via an associated API (Application Program Interface), to pass the Java components to the instrumentation component. In either case, the instrumentation component preferably determines whether each such application component is to be instrumented for monitoring based on configuration data pre-specified by a user. This configuration data may also specify that only certain methods of a given application component are to be instrumented/monitored. A user of the monitoring system can thereby exclude from monitoring those components and methods that are not believed to be sources of performance problems. The instrumentation component may alternatively be designed to instrument all application components, and/or all method of those components selected for instrumentation.

BRIEF DESCRIPTION OF THE DRAWINGS

A monitoring system and associated methods that embody various inventive features will now be described with reference to the following drawings.

DETAILED DESCRIPTION OF THE PREFERRED EMBODIMENTS

Figure 1A:
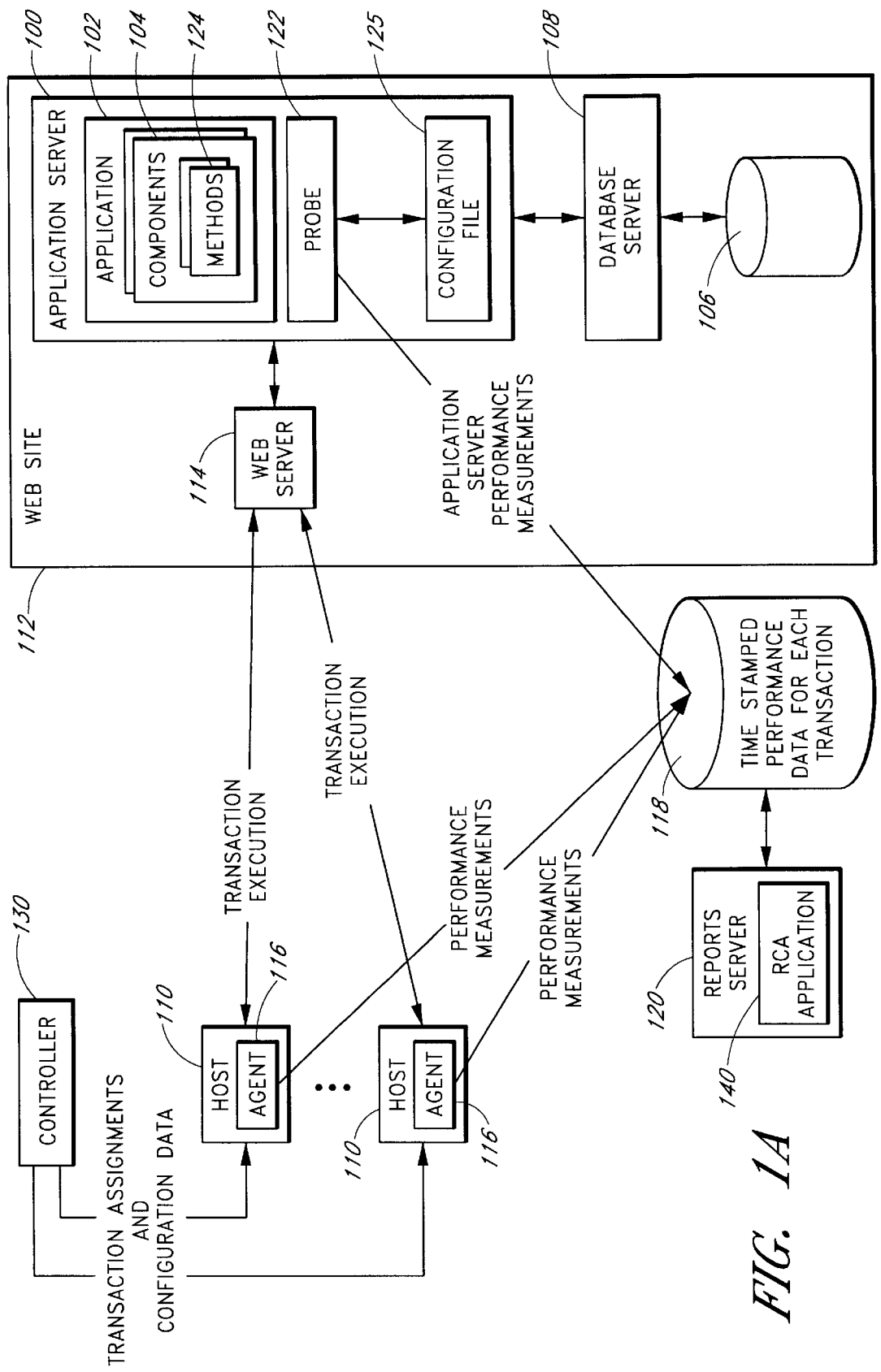
FIGS. 1A and 1B are block diagrams of a web site monitoring system, and illustrate how the monitoring system monitors the performance of application servers according to one embodiment of the invention.

The present invention provides an application server monitoring feature, and various associated methods for evaluating the performance of web-based or other software applications executed by an application server. The feature is particularly useful for monitoring multi-tier applications, such as but not limited to J2EE (Java™ 2 Platform, Enterprise Edition) compliant applications. The application server monitoring feature is preferably incorporated into a web site or other transaction server monitoring system to assist designers and administrators in pinpointing application-related performance problems.

In order to illustrate one particular embodiment of, and application for, the invention, the application server monitoring feature will be described in the context of a web site monitoring system of the type described in U.S. Pat. No. 6,449,739, and U.S. application Ser. No. 10/038,098, filed Oct. 19, 2001 (the disclosures of which are hereby incorporated by reference), and will focus primarily on the monitoring of Java applications. As will be apparent, however, the invention is not so limited. For instance, the inventive techniques described herein can also be used to monitor other types of servers and systems (such as .NET systems), including those that use proprietary protocols (e.g., SAP R/3 and mainframe systems) and/or are accessible only to internal users of a particular organization. In addition, the feature and its various inventive aspects may be incorporated into a load testing system or a web site functionality-testing system used to test applications that have not yet been deployed.

Accordingly, the following description is intended only to illustrate, and not limit the scope of, the present invention. The scope of the invention is defined only by the appended claims.

Unless indicated otherwise, it may be assumed that the process steps described herein are implemented within software modules (programs) that are executed by one or more general purpose computers. The software modules may be stored on or within any suitable computer-readable medium.

I. Overview

FIG. 1 illustrates the general components of the monitoring system, and illustrates how these components may be deployed within a network to test and monitor a web site 112. The system may incorporate some or all of the features and components disclosed in U.S. Pat. No. 6,449,739, and U.S. patent application Ser. No. 10/038,098, referenced above; however, only those features and components that are helpful to an understanding of the invention will be described herein.

As depicted by FIG. 1, the web site system 112 ("web site") being monitored includes an application server machine or computer 100 ("application server") that runs one or more applications 102. Although a single application 102 is shown for purposes of illustration, the application server 100 may run many different applications, some or all of which may be monitored concurrently using the application server monitoring feature. The web site 112 may also include additional application servers 100. As shown in FIG. 1, the application 102 typically provides user access to one or more back-end databases 106 through one or more database servers 108.

The application 102 is preferably a multi-tier application, and may, for example, provide functionality for implementing one or more business processes, such as setting up a user account, placing an order, or generating a report. This functionality is preferably implemented using one or more application components 104, and typically many different components 104. The components may, for example, include objects provided in Java™ 2 Platform, Enterprise Edition (J2EE), or objects based on another multi-tier applications standard. For example, the application may make use of one or more of the following types of J2EE components: servlets, JSPs (Java Server Pages), EJBs (Enterprise JavaBeans), JDBC (Java Database Connectivity), JNDI (Java Naming and Directory Interface), JMS (Java Message Service), and JTA (Java Transaction API).

As described below, the application server monitoring feature, as implemented in the preferred embodiment, allows users of the monitoring system to monitor the times spent by each such application component or component type processing specific user transactions (e.g., login, execute search, place order, etc.). The system also preferably reveals the impact these component execution times have on end-user performance (performance as seen by end users of the web site), such as by displaying transaction response times for the same user transactions over the same time period.

The component execution time measurements are preferably conveyed to users of the monitoring system in the form of application server "breakdown" reports, examples of which are included in the drawings and described below. For instance, a report (or a set of related reports) may convey that the average response time for a particular transaction over a particular time period, as seen by end users, was 7 seconds, 3.5 seconds of which is attributable (on the average) to the application server, and 3 seconds of which is attributable more specifically to the execution of EJBs on the application server 100. In one embodiment, a user can also drill down to the method level to determine the amount of time attributable to specific methods of these and other components. The breakdown reports and associated data greatly facilitate the task of determining which, if any, of the application's components 104 are the sources of long transaction or server response times.

The web site 112 also includes at least one web server machine 114 ( "web server"). Although a separate web server machine 114 is typical, the same physical machine can serve as both a web server and an application server 100. The web site 112, including the application(s) 102 being monitored, is typically but not necessarily "deployed" at the time of monitoring, meaning that it is being accessed by end users during monitoring.

As illustrated in FIG. 1, the web site 112 is preferably monitored by one or more remote host computers 110, each of which runs an agent component 106 that emulates the actions of real users. A particular host computer 110 that runs the agent component 106 is referred to herein as an "agent" or "agent computer" 110. The agent or agents 110 can be implemented, for example, using dedicated agent computers (e.g., provided by a monitoring service provider), actual user computers that serve part-time as agents, or a combination thereof.

Each agent 110 can be remotely configured to periodically execute a particular script or executable that specifies one or more user transactions to be executed between that agent 110 and the web site 112, as is known in the art. A given transaction may, for example, be a login operation, placement of an order, or a search operation. Typically, each transaction is invoked by a single page request, although the monitoring system may also support transactions that include multiple page requests per transaction.

As a transaction is executed, the agent 110 monitors one or more associated performance metrics or parameters, such as transaction response time (the amount of time the transaction takes to complete), server response times, load times for specific page components, transaction pass/fail status, etc. Typically, different agents 110 are set up in different user locations (cities, office locations, etc.) to monitor response times and other performance parameters as seen by end users of the web site 112 in such locations. The agent(s) 110 used to monitor the web site 112 preferably report their respective performance parameter measurements (response times, transaction pass/fail status, etc.) for storage in a central database 118, allowing such data to be viewed in aggregate form via various, online and interactive reports of a reports server 120.

Although automated agents 110 are preferably used to proactively exercise and monitor the web site, as described below, the application server 100 may additionally or alternatively be monitored based on real user traffic (e.g., as actual users access specific pages of the web site or perform certain types of transactions). Real user traffic may also be used to measure transaction response times, server response times, and other metrics, such as by using passive agents that operate as described in U.S. patent application Ser. No. 09/664,264, filed Sep. 18, 2000 (the disclosure of which is hereby incorporated by reference), and/or by using agents that are embedded in web pages downloaded by users.

To enable the application server 100 to be monitored, at least one of the agent computers 110 is configured to execute a transaction that causes the application 102 to be invoked. For example, if the application 102 is a search engine, one or more of the agents 110 may be configured to periodically submit search queries to the search engine. When an agent computer 110 executes such a transaction, it sends a request to the web server 114, and the web server 114 communicates with the application server 100 to initiate execution of the application 102. As the application 102 executes, a number of the application's components 104 may be invoked, typically as part of a "chain reaction" in which one component is executed at a time. For instance, the page request may invoke a servlet, which in turn calls a session EJB, which in turn calls an entity EJB, which in turn executes a database query. Because of the chain reaction nature of this process, a particular component can act as a bottleneck, causing the application 102 to perform poorly overall. When the application 102 completes execution, the web server 114 returns a response to the host computer 110, such as a search results page or login success web page.

As illustrated in FIG. 1, the task of monitoring the application 102 during transaction execution is performed by a probe 122 installed on the application server 100. The probe may be installed on more than one application server 100 of the web site 112 to allow each such application server to be monitored. The probe 122 operates generally by monitoring and reporting the execution of specific components 104 to measure the execution times of such of components, and optionally the execution times of specific methods 124 (procedures, functions, routines, etc.) used by such components.

As described below, the execution times are measured by the probe in-part by instrumenting the code of the monitored components 104, and in particular the methods 124 of such components, to add hooks. The probe 122 may also take other performance measurements during transaction execution, such as the amount of time the application server 100 takes to allocate a thread to the transaction. In one embodiment, the probe 122 monitors the execution of a transaction by detecting that a particular thread that is running a servlet or JSP is part of a monitored transaction, and then tracking the execution of this thread until the servlet or JSP is completed. As part of this process, the probe 122 records the execution start and stop times of some or all of the components 104 called by the servlet/JSP.

In one embodiment, the probe 122 monitors the application 102 only during the execution of agent-initiated transaction requests that are tagged or "colored" for application server monitoring. With this approach, the overhead associated with monitoring the application 102 via the probe 122 advantageously is not incurred with respect to transactions executed by real users, and with respect to other transactions executed by the agent(s) 110. The probe 122 may alternatively be configured to monitor the application during execution of all transactions, every Nth transaction, all transactions associated with a particular page or component, etc.

The probe 122 reports the various measurements (depicted by the label "application server performance measurements" in FIG. 1) to the database 118 for storage in association with the particular transaction. Although a direct arrow is shown from the probe 122 to the database 118, the probe may actually report the application server performance data to the agent 110 that executed the transaction (or to another intermediate component), which may in turn forward this data to the database 118 together with the various associated performance measurements (end-user response time, network time, server time, etc.) ordinarily reported by the agent 110. Each set of transaction-specific measurements generated by the probe 122 may be reported to and stored in the database 118 together with various information used to generate reports, including but not limited to the following: a transaction ID, an ID of the host or agent computer 110 that executed the transaction, the location and/or other attributes of the agent computer 110, an ID or address of the application server 100, a monitoring session ID, and an execution time stamp. The database 118 thus stores, in association with specific agent-executed transactions, transaction response time measurements generated by the agent(s) 110, together with associated application server performance measurements taken by the probe 122. Although only one web site 112 is shown in FIG. 1, the system may monitor, and the database 118 may store and aggregate performance data for, many different monitored web sites 112, each of which may have the probe 122 installed on one or more application servers 100.

The reports server 120 preferably uses the data reported by the agent(s) 110 and the probe(s) 122 to generate and display various reports that reveal how much time the application server 100 is spending executing specific components, specific methods, and/or specific types of components. These reports advantageously allow these measurements to be viewed and analyzed separately for specific transactions or sets of transactions. Thus, for example, a monitoring administrator can use the reports to track the execution of a particular transaction through all of the application components 104 it invokes, and view the time spent by each such component during execution of the transaction. The reports also preferably reveal how much of the overall transaction response time seen by end users (as measured by the agents 110) is attributable to specific application server components and/or methods.

As depicted in FIG. 1A, the probe 122 may access a configuration file 125 that directly or indirectly specifies which components 104 and methods 124 to be monitored. This configuration file may be modified over time by monitoring personnel in order to pinpoint specific problems. For instance, once a particular component 104 has been identified as a potential problem, the configuration file 125 may be updated to indicate that the component is to be monitored. The system may also support the ability to monitor only specific methods of that component, and not others. As described below, the configuration file may optionally specify which components and methods are to be monitored indirectly through a set of rules or heuristics. The configuration file may also specify other performance measurements to be taken by the probe 122. Although a configuration file is used in the implementation shown in FIG. 1A, the configuration data may be stored in any appropriate repository and form.

The communications depicted in FIG. 1A between the agents 110 and the web site 112; between the agents 110 and the database 118; and between the probe 122 and the database 118, typically occur over the Internet and/or another computer network (not shown). The various types of performance data may be written to the database 118 by an appropriate database server (not shown), which may but need not be the reports server 120.

With further reference to FIG. 1, the agent computers 110 may be configured remotely using a controller program 130 ("controller"). The controller may, for example, run on a machine of a user responsible for setting up monitoring sessions, or may be implemented as a hosted application on an appropriate web site. Using the controller 130, a user can define transactions to be executed, assign such transactions to specific agent computers 110, and assign attributes such as "location," "organization" and "ISP" to specific agent computers 110, as described generally in U.S. Pat. No. 6,449,739. For each defined transaction, the controller 130 allows the user to selectively enable or disable application server monitoring to control whether the probe 122 is to collect data for that transaction.

When application server monitoring is enabled for a particular transaction, the agent component 116 includes encoded data within the associated HTTP/transaction requests sent to the web site 112, signaling to the probe 122 that transaction breakdown data collection is enabled. This process is referred to herein as transaction request "coloring." The encoded data may, for example, be incorporated into the headers and/or tags of the HTTP requests by the agent component 116.

The encoded data sent with the HTTP requests may optionally include such information as an ID or name of the transaction (e.g., "login"), an ID of the agent 110 executing the transaction, a monitoring session ID, and the other data elements mentioned above. This information may be extracted by the probe 122, and returned along with the probe's performance measurement data, so that the probe's measurements may be stored in the database 118 in association with the transaction, agent, and monitoring session, etc. to which such measurements correspond. Alternatively, the probe 122 may simply return its transaction-specific measurements to the corresponding agent 110, and the agent may then forward these measurements to the database 118 together with the associated transaction ID, agent ID, monitoring session, ID, etc. In one embodiment, all of the agent and probe generated performance data generated for a given transaction is stored in a corresponding row of the database 118.

Although a controller 130 is preferably used to configure the agent or agents 110, the agents can alternatively be configured directly by on-site personnel, without the use of a separate controller program. In addition, as mentioned above, the application server 100 may additionally or alternatively be monitored based on real user traffic, without the use of transaction request coloring. For example, the probe may be configured to monitor all J2EE activity caused by accesses to a particular JSP/servlet page, or all such pages.

Figure 1B:
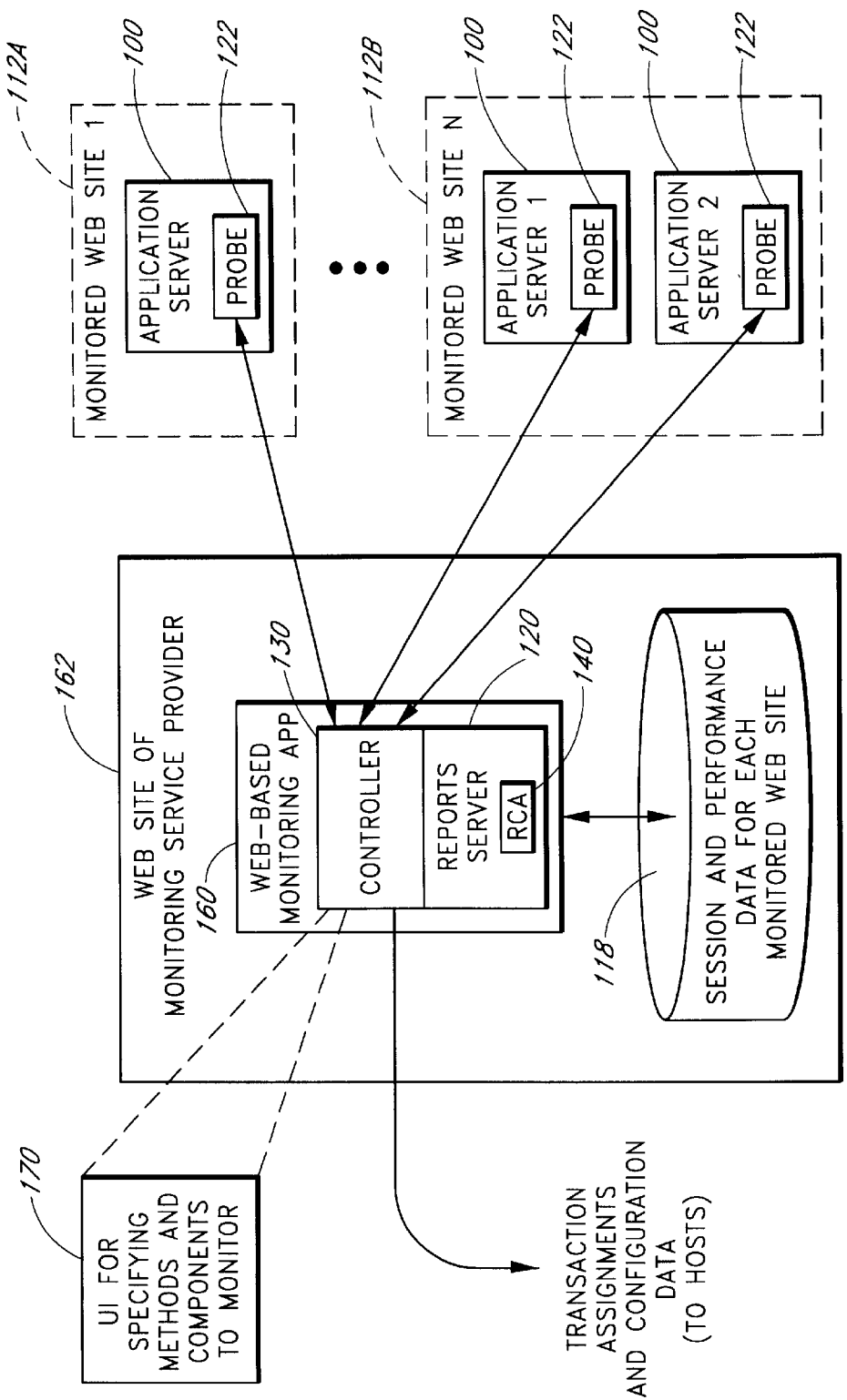

As depicted in FIG. 1B, the controller 130 and the reports server 120 may optionally be provided as part of a web-based monitoring application 160 that is accessible to users via the Internet. The web-based monitoring application 160, may, for example, be hosted by the web site 162 of a monitoring service provider. The web-based monitoring application 160 may provide functionality for users to perform some or all of the following actions, as well as others, with respect to their respective web sites 112: (1) upload and/or record scripts that specify transactions to be monitored; (2) assign transactions to specific agent computers (hosts) 110 for execution, (3) specify that a given transaction, or instance of a transaction, should be flagged or "colored" for monitoring by the associated probe 122; (4) specify the components and/or methods to be monitored by the probe 122 on each application server 100; and (5) access the various charts and graphs provided by the reports server 120 to analyze associated performance data. As is conventional, access to the configuration and performance data associated with a particular monitored web site 112 is preferably restricted to the user or users associated with that web site.

As mentioned above, the specific components to be monitored by the probe 122 on a given application server 100 are preferably specified by a configuration file 125 (FIG. 1A) stored on that application server. The configuration files 125 may be created and edited "manually" (e.g., with a simple text editor) according to a set of rules. Alternatively, a special user interface may be provided, such as the user interface 170 depicted in FIG. 1C, for allowing the user to view a listing of the Java components on a given application server, and specify which of those components are to be monitored. Selections made via this interface 170 are stored in the configuration file 125. The interface 125 may be provided as part of the probe 122 itself, or as depicted in FIG. 1B, may be provided by the controller 130. When provided as part of the controller 130, an authorized user can remotely modify the configuration files 125 over the Internet.

Figure 1C:
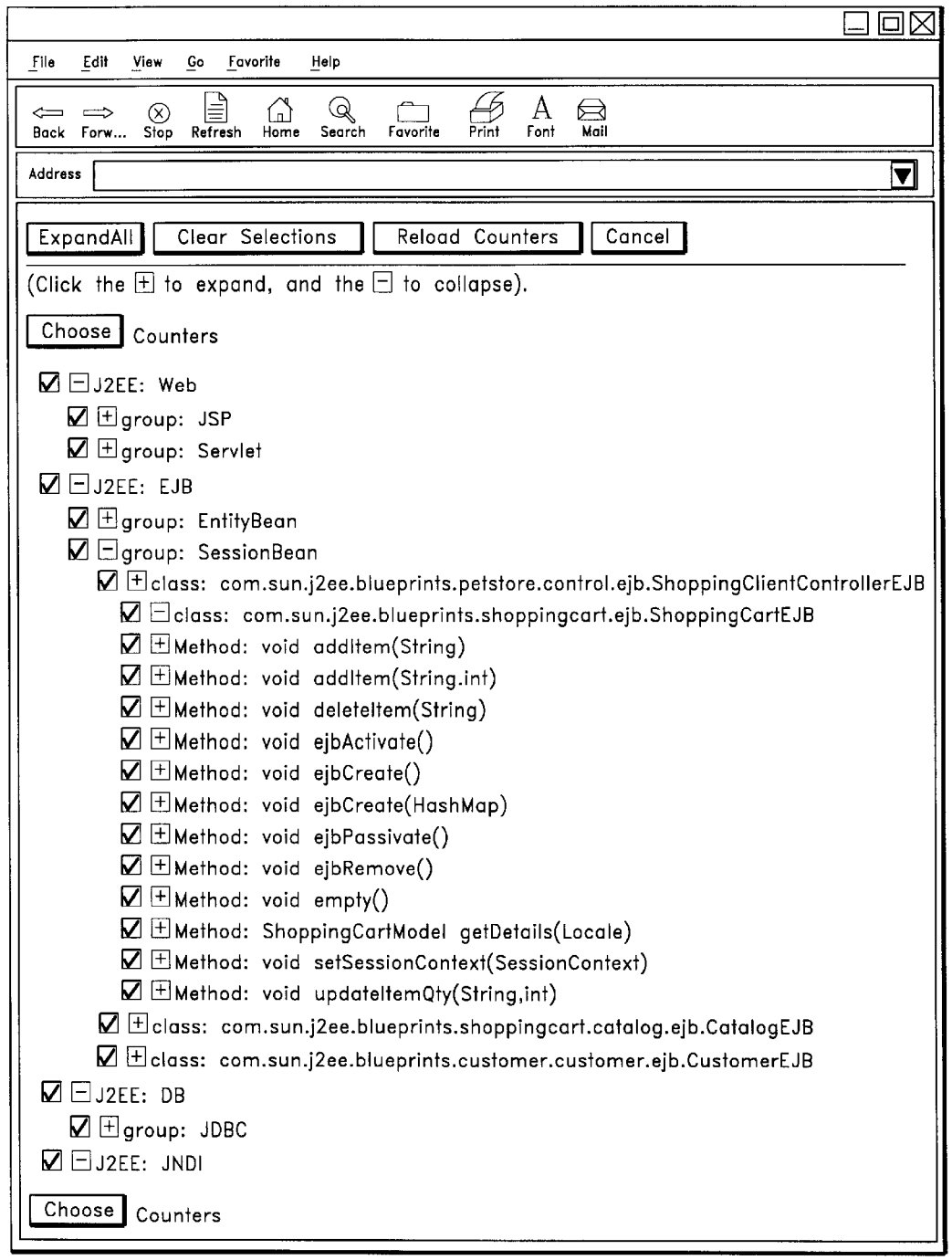
FIG. 1C illustrates an interface that may be used to specify the components and methods to be monitored on an application server.

As depicted in FIG. 1C, the user interface 170 may be in the form of an expandable tree which lists all of the component types or "groups" (JSP, servlet, session bean, etc.), the classes (components) within such groups, and the methods within such classes. The groups may also be arranged within specific categories, such as "J2EE: Web," "J2EE: EJB," and "J2EE: DB." The expandable tree may be generated based on information collected by the associated probe 122. For each item or "node" within the expandable tree, the user interface also provides a check box for enabling or disabling monitoring. Selection of a check box of a node at the class level, group level, or group category preferably causes all items falling below that node to be selected for monitoring by default, although the user can drill down and deselect specific items if desired. The interface thus allows the user to conveniently select or deselect all of the methods within a particular class, all of the classes within a particular group, and/or all of the groups within a particular category. The user interface 170 may alternatively omit the option to specify which methods are to be monitored, in which case selection of a given class may necessarily cause all methods within that class to be instrumented for monitoring.

II. Example Report Formats

FIGS. 2–5 illustrate examples of the types of reports that may be provided by the reports server 120 to display the application server performance data reported by one or more installations of the probe 122. As will be recognized, numerous other report formats are possible. A navigation tree for navigating between the various report types has been omitted to simplify the drawings.

Figure 2:
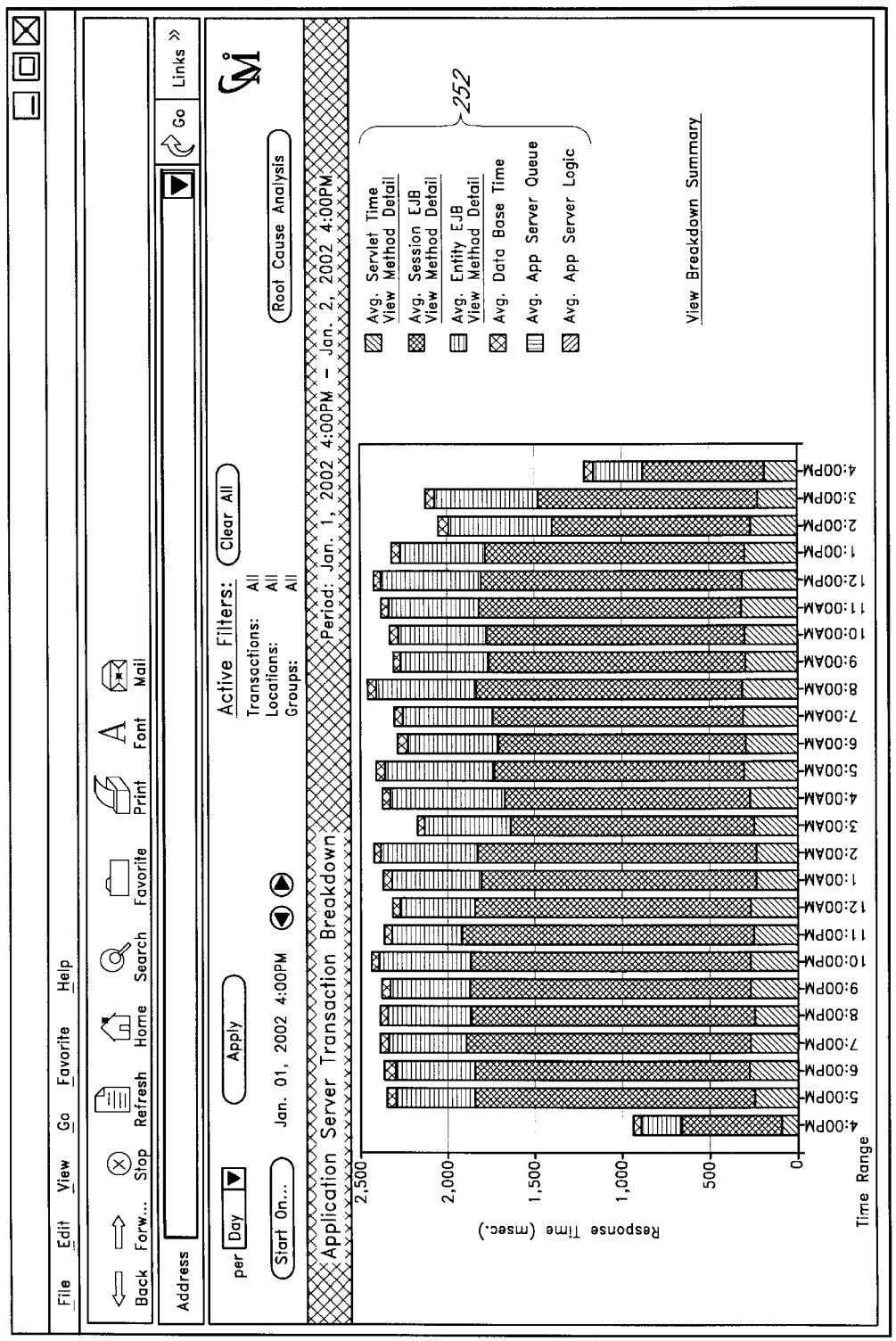
FIGS. 2–5 illustrate examples of performance reports generated by the reports server of FIG. 1A to facilitate an analysis of the application server's performance.

FIG. 2 illustrates an example "breakdown over time" report. This report displays a breakdown of the monitored application server's performance over a user-specified window of time. For each sub-window of time (one hour in this example), the report breaks down the application's aggregate execution time into the constituent times summarized in Table 1. This report reflects data collected by the probe 122 for all transactions for which application server monitoring has been enabled. For instance, if the agents 110 have been configured to periodically execute two transactions for which application server monitoring is enabled, both of which invoke the monitored application server 100, the report will be based on the data collected for these two transactions, but not others. To generate this report, the reports server 120 queries the database 118 to retrieve the probe-generated measurement data for all monitored transactions executed against the target web site 112 within the specified time window, and uses the retrieved data to calculate the six average constituent time periods shown.

TABLE 1

| Name | Description |
| --- | --- |
| Avg. Servlet Time | The amount of time that the transaction was processed by servlets |
| Avg. Session EJB Time | The amount of time that the transaction was processed by Session EJBs |
| Avg. Entity EJB Time | The amount of time that the transaction was processed by Entity EJBs |
| Avg. Database Time | The amount of time that passes from the moment the application server sends an SQL query to the database server until the database server returns a response to the application server |
| Avg. App Server Queue | The amount of time that passes from the moment the application server receives a transaction request until the request is allocated a thread |
| Avg. App Server Logic | The amount of time that passes from the moment the transaction request is allocated a thread until the request is handed off to a servlet |

Using the "filters" button in FIG. 2, the user can also limit the report to data associated with a specific agent 110 or set of agents. As described in U.S. Pat. No. 6,449,739, the set of agents may be specified by the user by designating one or more agent attributes, such as agent location, organization, and/or ISP. For example, the user may select the location "New York" to restrict the display to performance data generated in response to transactions executed by agents 110 residing in New York.

Figure 4:
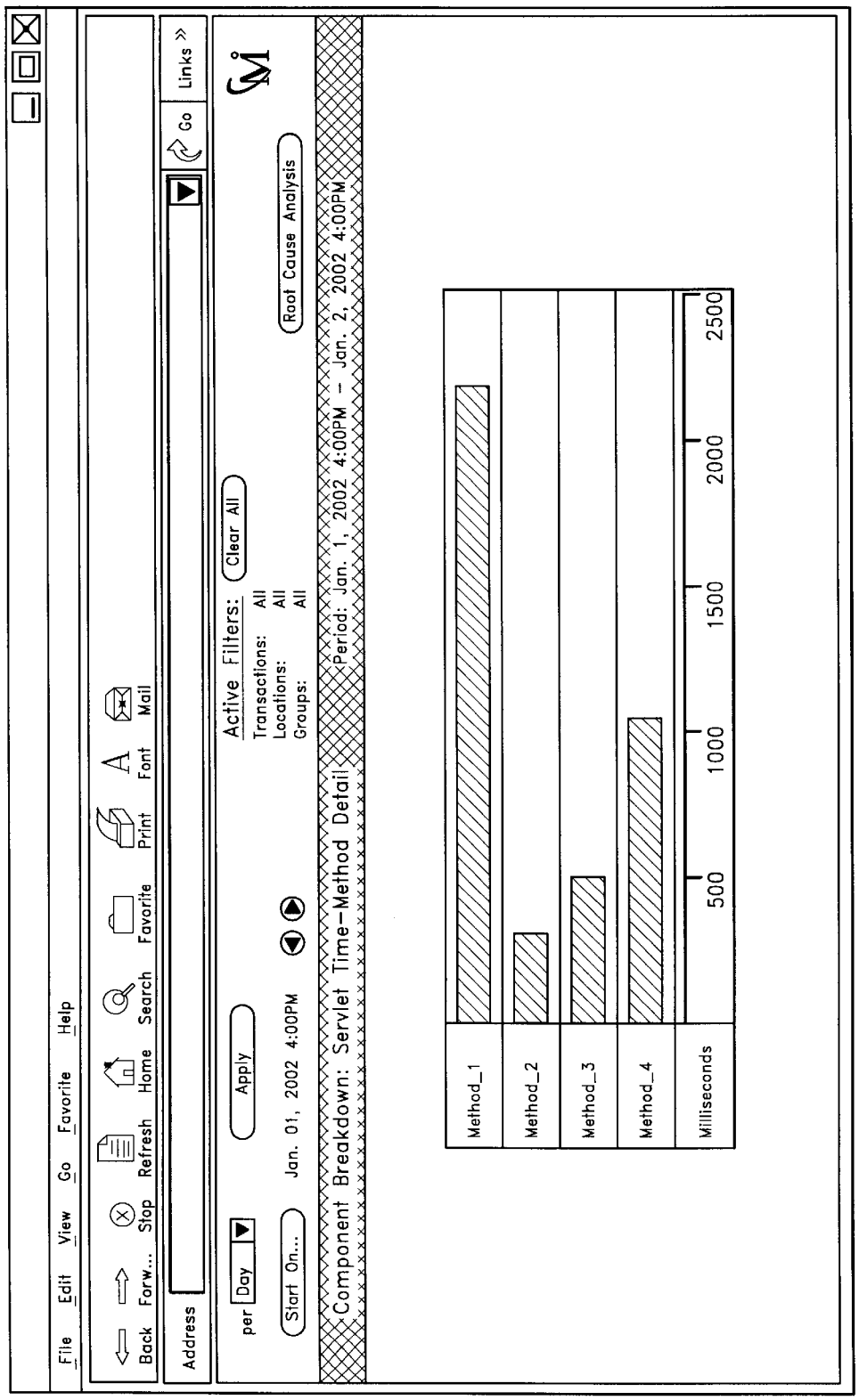

By viewing the report shown in FIG. 2, monitoring personnel may determine, for example, that the application server 100 spends more time executing session EJBs than the other types of monitored application components. To further analyze this possible performance issue, the user can select the "view method detail" link for "avg. session EJB time," and view a breakdown of the time spent by specific session EJB methods 124. An example method breakdown report is shown in FIG. 4. If necessary, the user can also update the configuration file 125 to designate specific session EJB methods 124 to be monitored. Ultimately, the user may use the application performance data revealed in this and the other reports to improve the design of the application 102.

The example performance data shown in FIG. 2 reveals that average session EJB time increased from about ½ second to about 1.5 seconds between 4 pm and 5 pm during the selected time window. To assess the impact this increase had on end users, the user can view a report, such as the transaction breakdown report of FIG. 5, that reveals average transaction response times over the same time window.

Figure 3:
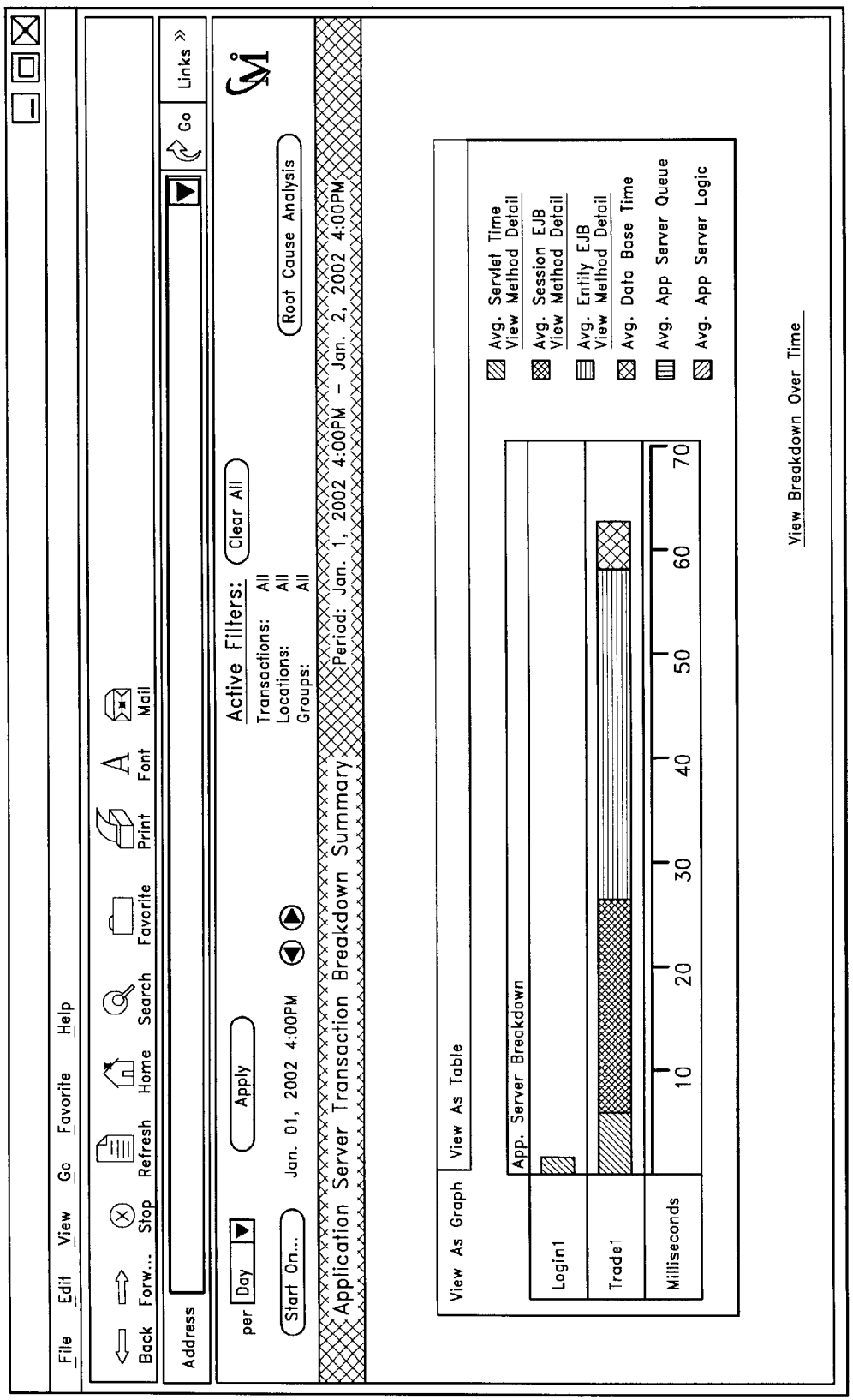

FIG. 3 illustrates an example "breakdown summary" report for a user-specified time period. This report is based on the same six performance metrics as the "breakdown over time" report, but displays the breakdown separately for each monitored transaction. The user can thus identify transaction-specific performance problems that reside within the application server 100. To generate the data for a particular transaction (such as "login1"), the reports server 120 queries the database 118 to retrieve the probe-generated measurement data for all instances or "runs" of this transaction over the specified time window, and then uses the retrieved data to calculate the averages of the six constituent time periods. Although the values shown in FIG. 3 are averages, the user may be given the option to drill down to specific instances of the subject transaction. As with the "breakdown over time" report, the user also can limit the breakdown summary report to data associated with a specific agent 110 or set of agents.

FIG. 4 illustrates a component breakdown report that shows the average execution time of each of multiple servlet methods 124 over a user-specified time window. This report may be used to effectively drill down to the servlet method level to determine whether a servlet performance problem is being caused by a particular method or set of methods. Similar breakdown reports may be provided for specific components 104. As with the reports in FIGS. 2 and 3, the user may limit the display to performance data associated with a particular agent 110 or set of agents.

Figure 5:
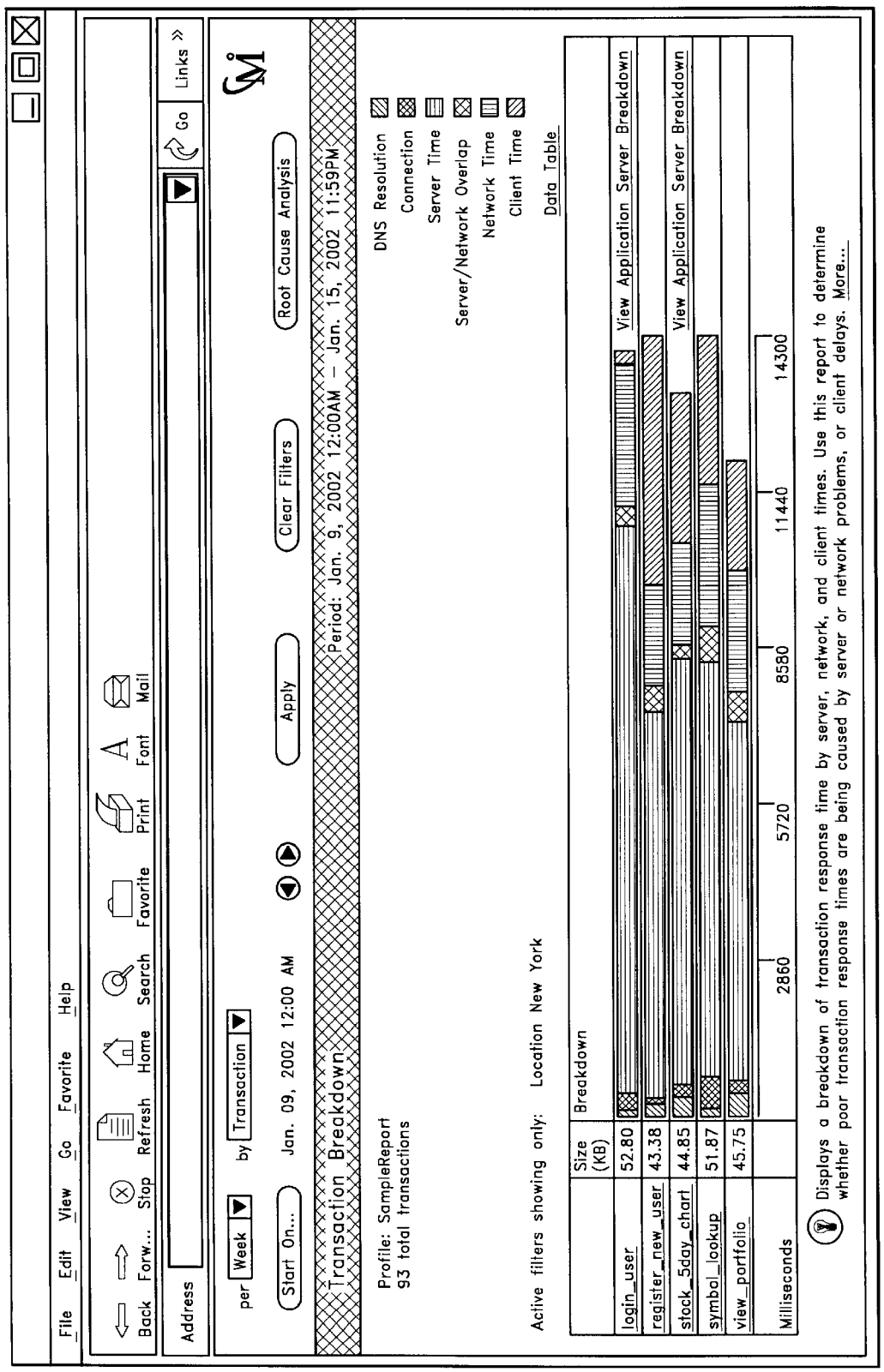

FIG. 5 illustrates one example of how the application server monitoring reports may be accessed from, and integrated with, other types of reports provided by the reports server 120. The particular report shown in FIG. 5 is a transaction breakdown report that breaks down the total end-user transaction time for each of multiple transactions into the following five categories: DNS (Domain Name Server) resolution, connection, server time, server/network overlap, network time, and client time. A preferred method for generating such a breakdown is disclosed in U.S. pat. application Ser. No. 10/038,098, referenced above. In this example, a "view application server breakdown" link is displayed next to the graphs for the "login_user" and "stock_5day_chart" transactions, indicating that application server monitoring data exists in the database 118 for these two transactions.

By selecting one of the "view application server breakdown" links, the user can effectively drill down to further analyze the server time data displayed in the transaction breakdown report. The user may wish to do this if the transaction breakdown report reveals that the average server time for a particular transaction is unusually long, or has increased unexpectedly. The ability to view the probe-generated application server measurements in the context of associated end user and server response times allows administrators to assess the impact specific application components are having on overall server and end user performance. For example, in addition to indicating the value of an entity EJB response time over a particular time period, a report (or set of integrated reports) may reveal that this entity EJB response time contributed to 70% of the overall response time for a specific end-user transaction, and that the recent degradation in response time for this transaction was caused by the entity EJB response time suddenly increasing from 40% to 70% of the overall response time.

Where the monitored web site 112 includes multiple application servers 100, the reports server 120 may also provide reports and graphs of the type shown in FIGS. 2–5 separately for each application server 100 of the web site. For example, a "breakdown by server" report may be provided that breaks down the performance of a given component or method by application server. This may be useful, for example, for evaluating whether all of the application servers in a load balanced environment of functioning properly. Reports may also be provided that aggregate the data of all, or of a selected group, of the web site's application servers.

The performance data generated by the probe 122 and the agents 110 may optionally be analyzed automatically by a root cause analysis (RCA) application of the type described in U.S. patent application Ser. No. 10/038,098, referenced above. As depicted in FIG. 1, the RCA application 140 may run on or in association with the reports server 120 to assist users in efficiently pinpointing root causes of performance problems. The RCA application 140 preferably identifies those application components 104 that are the likely cause of performance degradations by monitoring changes is the probe's execution time measurements over time. For example, the RCA application may detect that the average servlet time over a five minute time window greatly exceeds its historical norm, and based on this fact, notify a user that servlets are the likely cause of an end-user performance degradation that occurred over the same time period. The algorithms applied to the probe's measurements by the RCA application 140 are preferably substantially identical to those described in U.S. patent application Ser. No. 10/038, 098.

III. Instrumentation of Code

In one embodiment, the task of monitoring the application components 104 and methods 124 is accomplished using a virtual machine configured to pass the invoked components (classes) to the probe 122 at load time for dynamic instrumentation. The virtual machine may, for example, be a Java™ virtual machine ("JVM"), and may be so configured using the JVMPI API (Java Virtual Machine Profiling Interface Application Program Interface) available from Sun Microsystems. Other APIs that may become available in the future may also be used to configure the virtual machine.

In addition, as described in section VI below, the JVM or other virtual machine may alternatively be modified by adding a patch to the virtual machine's class that is responsible for loading components for execution; with this approach, no special API is needed to configure the virtual machine. In one embodiment, this method is implemented using a utility program that adds a patch to the JVM's ClassLoader class on the application server 100. As described in section VI, two important benefits of this "patched JVM ClassLoader" approach are that (1) it is implemented purely in Java, and is therefore platform independent, and (2) the instrumentation method works regardless of whether the particular JVM installed on the application server 100 supports the Java Virtual Machine Profiling Interface.

The probe 122 preferably instruments (adds hooks to) a monitored class by instrumenting some or all of the methods 124 within that class. As described below, a particular method is instrumented by adding a "start" call at the beginning of the method and an "end" call at the end of the method. These calls or "hooks" allow the probe to determine whether a particular invocation of an instrumented method corresponds to a transaction that is colored for monitoring, and if it is, to record the start and stop time of that method. The start and stop times of some or all of the methods invoked by this transaction can thus be recorded. These measurements can then be aggregated at the component level to determine the amount of time spend by each component. Thus, the data collected by the probe for a given transaction execution event may be used to (1) trace the execution of a transaction through all of the application components executed by the virtual machine as part of the transaction, and (2) measure the amount of time spent by each such application component (and specific methods thereof) processing the transaction.

Although dynamic instrumentation is used in the preferred embodiment, the classes may alternatively be statically instrumented.

Figure 6:
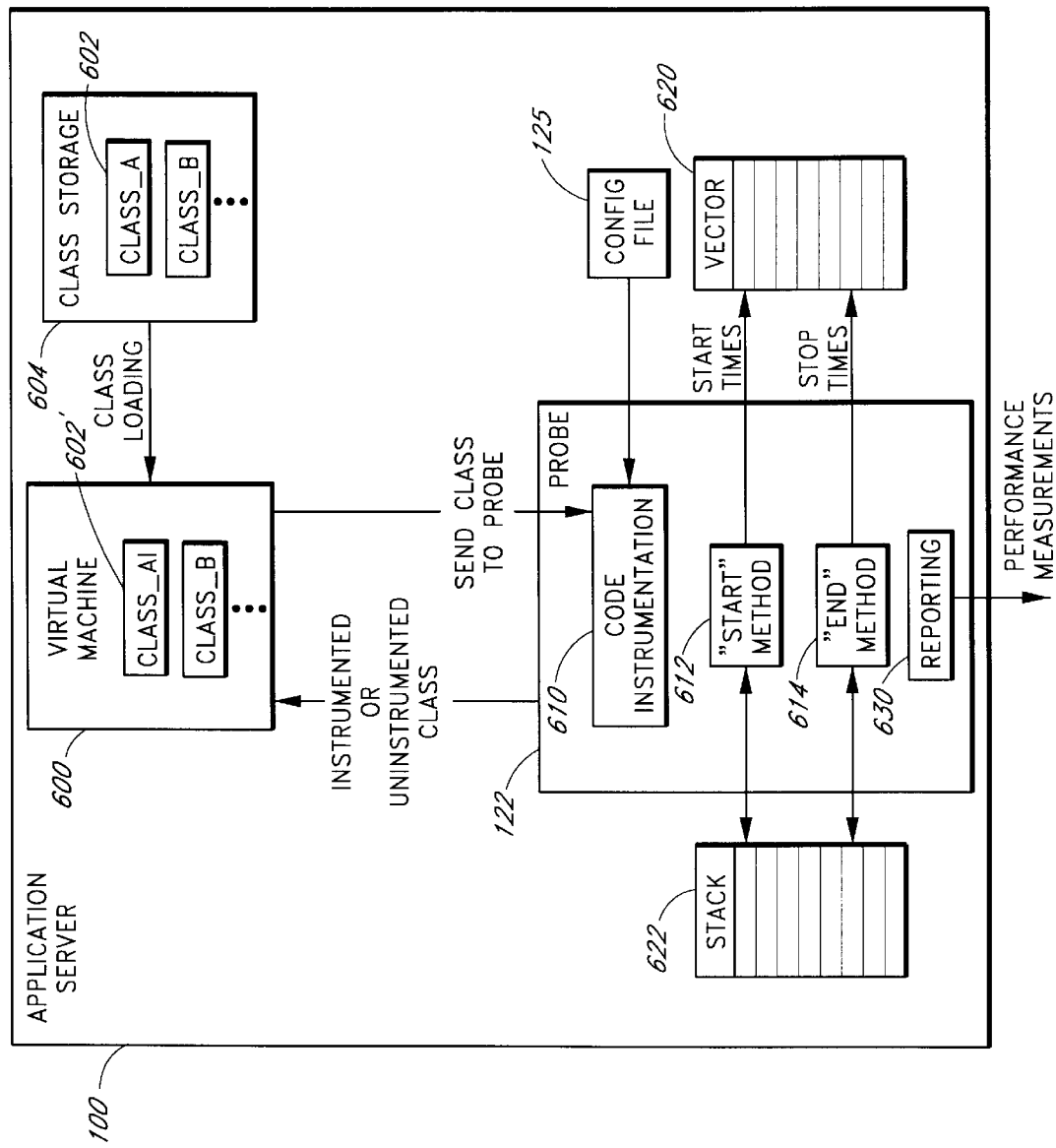
FIG. 6 illustrates the architecture and operation of the probe of FIG. 1A according to one embodiment.

FIG. 6 illustrates one implementation of the above-described dynamic instrumentation process. FIG. 6 also illustrates a set of components and data structures that may be used to (1) record execution start and stop times when instrumented methods are executed as part of monitored transactions, and (2) report these execution times, in raw and/or aggregated form, to an outside entity. It should be understood that the three processes illustrated in FIG. 6 (instrumentation, execution time monitoring, and reporting) typically occur at different times. Specifically, instrumentation occurs when a class is loaded into the Java or other virtual machine 600; monitoring of execution start and stop times occurs when the instrumented classes are invoked; and the reporting of collected data preferably occurs periodically. Further, although the probe 125 is depicted as being separate from the virtual machine 600 for purposes of illustration, the probe actually runs within the virtual machine in the preferred embodiment.

As depicted by FIG. 6, instrumentation occurs as follows. The virtual machine 600 obtains a class source 602 from a storage device 604, such a disk drive, at run time. An example of a class source is bytecode, a compiled format for Java™ programs. Prior to executing the class source 602, the virtual machine 600 passes the class source 602 to a "code instrumentation" component 610 of the probe 122. This component 610 preferably determines whether the class source 602 is to be instrumented for monitoring based on information contained in the configuration file 125. To instrument the class source, all of its methods are typically instrumented individually, so that each such method may be separately monitored. In the preferred embodiment, however, a user can deselect one or more of these methods— such as those not believed to be the cause of performance problems—in which case only some of the methods of the class source may be instrumented/monitored. Once instrumented, a particular class typically remains persistent in memory until the application server is restarted; the instrumented class may therefore service many client requests without being loaded/instrumented again.

In one embodiment, the configuration file 125 contains rules that are used by the probe 122 to dynamically determine, at load time, which classes (components) and methods should be instrumented for monitoring. The classes can be specified either directly, or by declaring that any class that inherits from a certain class or implements a certain interface should be hooked. Direct inheritance may be supported, as well as indirect inheritance of classes or interfaces, with any level of indirection. Methods to be monitored/hooked can be defined either explicitly or using wildcards.

As mentioned above, a utility program and associated user interface 170 may optionally be provided to assist web site operators in creating and editing the configuration files 125 on their respective application servers 100. This utility program may, for example, display a listing of all Java components and methods (and/or types of components and methods) currently installed on the application server 100, together with respective check boxes for indicating which should be monitored. Another approach is for the configuration file 125 to specify heuristics for determining which components and/or methods should be monitored. The use of a configuration file 125 allows administrators to flexibly monitor only those components, and optionally methods, that are the most likely sources of performance problems. For example, an administrator may wish to monitor all objects provided by a particular vendor, while refraining from monitoring those provided by a more reputable vendor.

Although a configuration file 125 is used in the illustrated embodiment, the configuration information that specifies which components and methods are to be monitored may alternatively be stored in another type of repository, such as an executable file or a database. In addition, some or all of this configuration information could be passed to the probe 122 in HTTP requests from the agents 110. Further, the probe 122 could be designed to monitor all components.

If, at load time, the probe 122 (code instrumentation component 610) determines that the class source 602 is to be monitored, the probe instruments the class source by adding calls to the probe's "start" and "end" methods 612, 614 within the class source 602. By default, these calls are added to all of the methods of the class source 602. As mentioned above, however, the configuration file may specify that certain methods are to be excluded—such as those explicitly deselected by the user via the interface of FIG. 1C. As illustrated in FIG. 6, the probe 122 then returns the instrumented class source 602' to the virtual machine 600 for execution.

If the probe determines that the class should not be monitored, it simply returns the class source without modification. In the particular example shown in FIG. 6, the virtual machine has loaded two classes, CLASS_A and CLASS_B, and only CLASS_A has been instrumented.

Although instrumentation of the class source 602 has advantages, it is not necessary. For example, in one embodiment, the class source 602 contains function calls to methods that are equivalent to the instrumenting methods. These methods are part of the class through inheritance, statically added to the class source 602, or through any other method suitable for adding functionality to a class. One skilled in the art will also realize that the embodiments disclosed herein may be practiced within any of a number of suitable environments, including environments that do not use a virtual machine.

IV. Monitoring of Instrumented Classes

The probe's logic for monitoring execution of instrumented classes resides within the "start" and "end" methods 612, 614 to which calls are added during instrumentation. Both of these methods may be implemented within servlet or JSP code executed by the virtual machine 600. As the virtual machine 600 executes an instrumented component's class source code, it also executes the start and end methods 612, 614 of the probe.

All of the J2EE components executed by the virtual machine 600 as part of a single transaction/page request are ordinarily executed within a single thread, with the first invoked component usually being a servlet or a JSP. When the start method 612 is first called, it determines whether this thread belongs to a transaction to be monitored. As described above, this may be accomplished by determining whether the associated HTTP request includes a special tag or header inserted by the agent 110. Because the start method 612 is effectively part of the JSP or servlet being executed, it has access to this information. In implementations that support application server monitoring of real user transactions, the start method 612 may monitor the transaction if it corresponds to a particular JSP or servlet page, or based on some other attribute of the transaction/HTTP request.

Figures 7A, 7B:
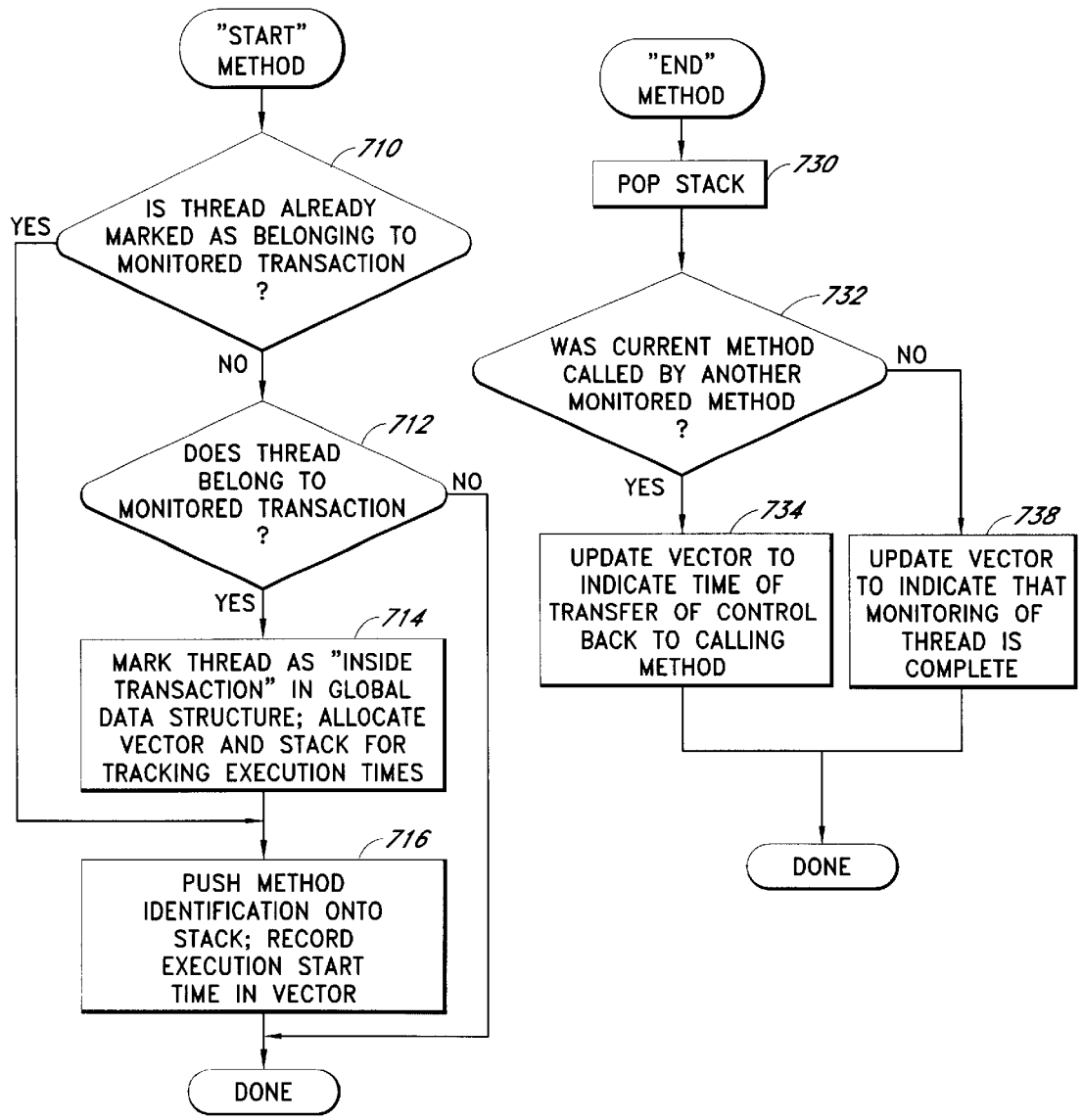
FIGS. 7A and 7B illustrate the operation of the "start" and "end" methods, respectively, depicted in FIG. 6.

The operation of the "start" method 612 is depicted by FIG. 7A. The first time the start method 612 is called by a given thread, the start method determines whether the thread belongs to a transaction to be monitored (block 712), and terminates processing if it is not. As described above, in one embodiment, the determination of whether the thread belongs to a monitored transaction involves determining whether the transaction is colored for monitoring. Because only agent-initiated transactions can ordinarily be colored in this embodiment, real user transactions are prevented from being monitored as the result of block 712. Agent-initiated transactions that are not colored are also excluded from monitoring.

If the thread belongs to a monitored transaction, the start method 612 marks the thread as "inside transaction" in a global structure (not shown), and allocates a set of data structures to the thread (block 714). As illustrated in FIG. 6, these data structures include a vector 620 or other data structure for collecting the execution times of each method 124, and a stack 622 used to track the execution path and termination point of the thread. The start method 612 also records the execution start time in the vector 620, and places an identifier of the invoked method 124 on the stack 622 (block 716).

Thereafter, each time the "start" method 612 is called, it determines whether the thread is inside a monitored transaction by looking at the global structure (block 710). If the thread is inside a monitored transaction, the start method 612 adds the start-time to the vector 620 of this thread, and places an identifier of the starting method 124 on the stack to note entry into the code of this component (block 716).

FIG. 7B illustrates the operation of the "end" method 614. Each time the end method 614 is called, it initially checks the global structure to see if the thread has been marked as belonging to a monitored transaction (block 726), and skips over the remaining steps if it has not. If the thread is marked as belonging to a monitored transaction, the vector 620 is updated with the execution end time of the method 124 that just ended (block 728). The "end" method also pops the stack 622 (block 730), and then checks the top element of the stack to determine whether the now-ending method 124 had been called by another instrumented method 124 (block 732). If the identifier of another instrumented method 124 exists on the stack (indicating the existence of a nested call to a monitored method), processing is complete; otherwise, the vector 620 is updated to indicate that tracking of the thread is complete (block 738), since the method 124 that just ended is the first monitored method that was called as part of this thread. As described below, the measurements recorded within the vector 620 (including associated method and class identifiers) are preferably reported by the probe 122 asynchronously, rather than upon termination of the thread.

At this point, monitoring of the transaction is not necessarily complete (unless the transaction is a real user transaction, in which case it is treated as complete), as the calling agent 110 can, in some embodiments, call other components 104 as part of the same transaction. For example, the agent 110 may, as part of the same transaction, request another servlet/JSP page. In this scenario, the above-described process is repeated to generate a new vector of measurements, which may later be associated or combined with the first vector of measurements by the calling agent 110 or another appropriate component.

As depicted by block 740 in FIG. 7B, the method execution times recorded in the vector 620 may optionally be aggregated by the probe 122 upon completion of monitoring of the thread, or at the time of reporting, to calculate component execution times. This aggregation step may alternatively be performed in-whole or in-part outside the probe 122 and application server. Regardless of where and when the method execution times are aggregated, the execution time for each component 104 is preferably calculated as the sum of the execution times of all of its instrumented methods 124 that were invoked by the transaction.

Ultimately, the method and component execution times generated over a period of time (and over multiple instances of the particular transaction) may be averaged for purposes of reporting to the user. In addition, the average component execution times may be aggregated by component type to generate data indicative of the amount of time spent by each type of component (EJBs, servlets, etc.) on the particular transaction. Further, data collected by multiple probes 122 (each of which runs on a respective application server 100) may be appropriately aggregated to generate data reflective of how a group of application servers is performing as a whole.

The probe 122 reports the captured measurement data asynchronously, preferably but not necessarily via the agent 110 that executed the transaction. The measurements may be reported by the probe 122 in any appropriate form, such as raw method start and stop times, total execution times generated from these start and stop times, and/or aggregated or average execution times for specific components or component types. In one embodiment, the data reported by the probe 122 is transmitted to the corresponding agent 110 as an XML (Extensible Markup Language) file or sequence. The reported measurements associated with a particular transaction are stored in association with that transaction, such that breakdowns can be generated separately for each monitored transaction.

The task of reporting the measurement data may be handled by a separate reporting thread 630 (FIG. 6), which may be started when the virtual machine 600 is started. This thread 630 may report the collected data at periodic intervals, at the completion of transaction execution, in response to polling messages, or using any other appropriate method. As mentioned above, the measurements may be reported together with associated data (transaction IDs, agent IDs, etc.) extracted from the associated HTTP requests.

In one embodiment, the probe 122 reports the execution time measurements at the method level, and these measurements are aggregated outside the probe (e.g., by the reports server 120) as needed to generate component execution times, average execution times, etc. Components are thus used to specify groups of methods to be instrumented and monitored by the probe 122, and also to aggregate method execution times for display.

In many cases, a given component or method will start and stop multiple times during execution of the particular thread and transaction. In such cases, the execution times generated through the above process preferably reflect the total execution time of each such component or method. For example, if a session EJB initially executes for 0.25 seconds before calling an entity EJB, and then executes for another 0.35 seconds after completion of the entity EJB before termination of the thread, the execution time for the session EJB would be 0.6 seconds.

V. Tracking Transactions Across Process Boundaries

In some cases, a given J2EE transaction may cross a process boundary. To track such a transaction across the process boundary, an ID of the transaction may be integrated into the native protocol that is being used for inter-process communication. For example, to transfer the transaction ID from a servlet to an EJB that is being called on a remote process/machine, the transaction may be added as one of the low-level parameters passed between the two processes. To accomplish this, the above-described instrumentation process may be appropriately supplemented to cause the monitored classes to pass the transaction ID. For example, for EJBs, the actual proxy/stub objects of the EJBs may be instrumented to add the additional information to the invocation.

VI. Code Instrumentation using Patched ClassLoader Class of JVM

As described in section III above, the Java Virtual Machine (JVM) 600 installed on a given application server 100 may be configured, using the Java Virtual Machine Profiling Interface (JVMPI) provided by Sun Microsystems, to cause the JVM 600 to pass classes to the probe 122 at load time. The probe 122 may then selectively and dynamically instrument those classes that are to be monitored.

An alternative method that may be used involves adding a hook or "patch" to the JVM's ClassLoader class, so that the task of dynamically instrumenting those components that are to be monitored is performed by the patched ClassLoader class of the JVM 600. One benefit of this approach is that it is implemented purely in Java, and is thus platform independent. Another benefit is that it works regardless of whether the particular JVM installed on the application server 100 supports the Java Virtual Machine Profiling Interface. In one embodiment, this "patched ClassLoader" method is used as the default method for instrumenting each component, and the JVMPI method is used only if the patched ClassLoader method is unsuccessful.

Figure 8A:
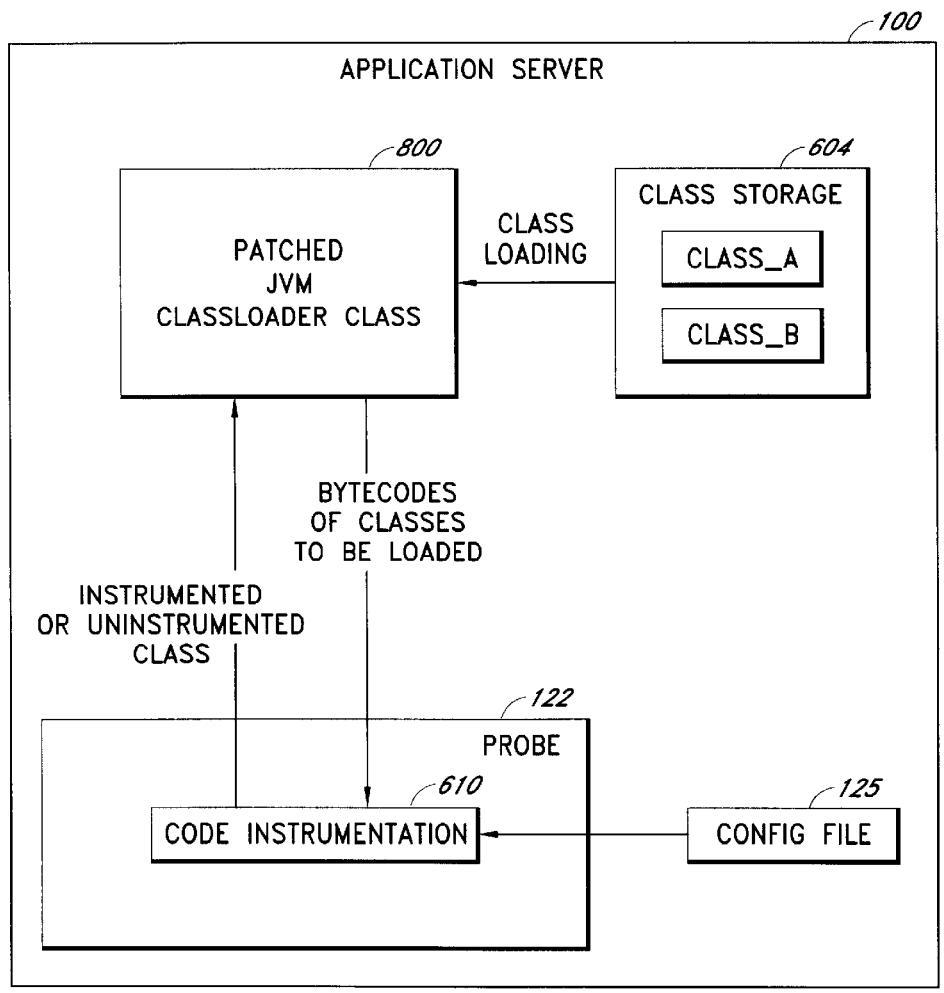
FIG. 8A illustrates an alternative dynamic code instrumentation method that uses a patched version of the class loader class of the Java Virtual Machine.

FIG. 8A illustrates how classes are instrumented once the patch has been added to the JVM ClassLoader class 800 of a JVM. The probe components used for recording and reporting execution times are omitted from this drawing, but may be the same as in FIG. 6. As illustrated, the instrumentation process is similar to the process depicted in FIG. 6, except that code instrumentation block 610 now receives the bytecodes of the classes being loaded before these classes are actually loaded. This occurs as the result of the hook (patch) having been added to the ClassLoader class 800.

Figure 8B:
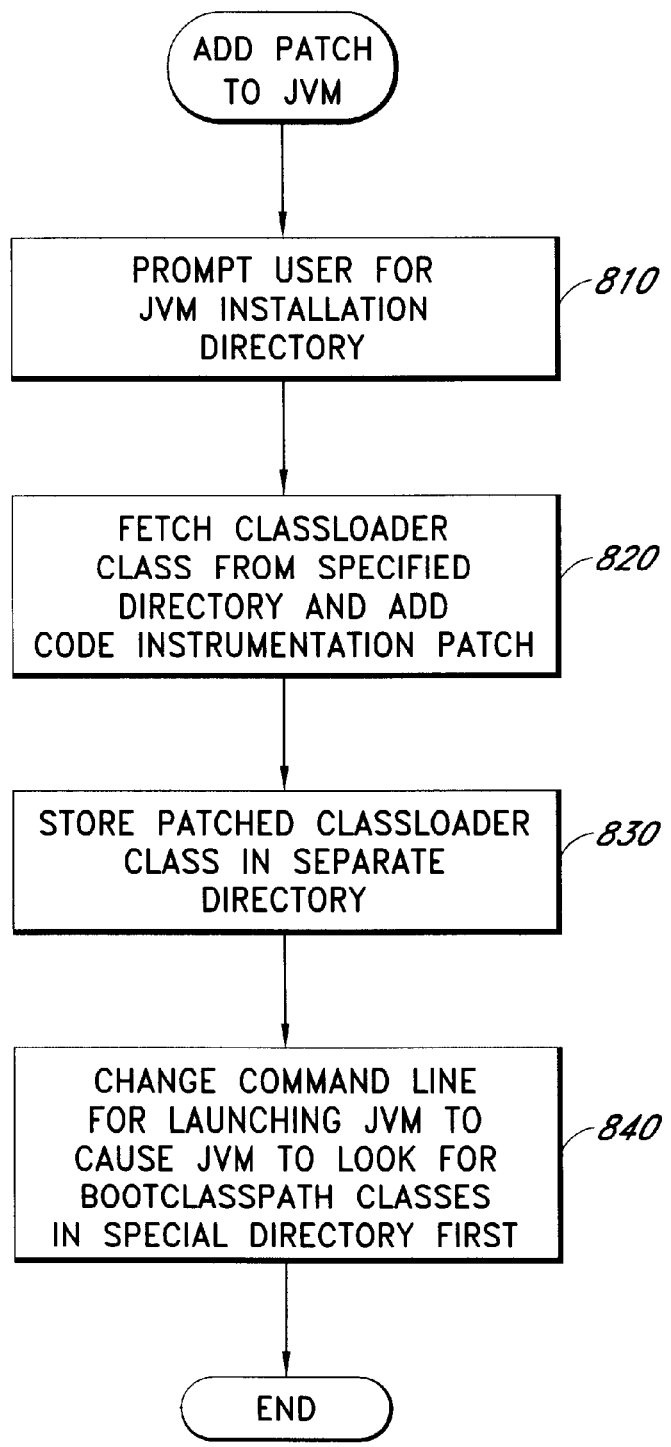
FIG. 8B illustrates a process by which a patch may be added to a Java Virtual Machine to implement the method of FIG. 8A.

The task of adding the patch may be performed off-line using a configuration tool that runs on the application server 100 in conjunction with, or as a part of, the probe 122. FIG. 8B illustrates the steps that may be performed by this configuration tool to install the patch. This process only needs to be performed once per JVM installation. As depicted by block 810 in FIG. 8B, the configuration tool initially prompts the user to specify the path to the JVM installation directory used by the particular application server 100. Once this path has been specified by the user, the configuration tool retrieves the ClassLoader class from the specified directory and adds the code instrumentation patch (block 820).

The patched ClassLoader class is then stored in a separate directory (block 830), such as a designated subdirectory of the probe's installation directory. Finally, the command line used by the operating system to launch the JVM is modified to cause the JVM to first look for bootclasspath classes in this special directory (block 840), so that the patched ClassLoader class will be loaded in place of the original ClassLoader class provided with the JVM. For example, if the probe is installed on the application server under c:\mercprobe, which includes the subdirectory c:\mercprobe\classes\boot, the configuration tool may store the patched class at C:\mercprobe\classes\boot\java\lang\ClassLoader.class, and modify the command-line parameters for running the application server to include the following flag: "-Xbootclasspath/p:C:\mercprobe\classes\boot".

The patched ClassLoader class may instrument J2EE components in the same manner as described above. Specifically, when a J2EE class is loaded, the patched ClassLoader class may use a configuration file 125 (or configuration information stored in another repository) to determine whether some or all of the methods of that J2EE class are to be monitored, and to instrument those methods that are to be monitored by adding calls to the probe's start and end methods 612, 614.

VII. Monitoring of Additional Performance Parameters

In addition to monitoring colored transactions as set forth above, the probe 122 may be designed to monitor and report certain application server performance parameters without regard to how the monitored components are invoked (e.g., by colored versus uncolored transactions). For example, in one embodiment, the probe 122 also monitors and reports the number of times each component (JSP, Session EJB, Entity EJB, JDBC, JNDI, etc.) is invoked over a given time period, and the average response time of each such component, without regard to how these components are invoked. These non-transaction-specific performance metrics may be reported to the database 118 in substantially the same manner as described above, and may be incorporated into performance reports that provide additional information about how the application server 100 is performing.

For instance, these additional performance measurements may be used to provide reports that display the average response time, average number of hits per second, and average load factor of each servlet, session bean, method of a selected object, and entity bean. As with the transaction breakdown data reported by the probe 122, some or all of these non-transaction-specific metrics may be displayed separately for each application server 100 within a given web site system 112, or may be aggregated across multiple application servers. The load factor for each component or method is preferably calculated as a product of its average response time and its average hits per second values, and is a very useful measure of performance.

These non-transaction-specific metrics may also be used as a basis for defining heuristics that specify which components and methods are to be instrumented for transaction-specific monitoring. For example, a heuristic may be defined specifying that all methods of the component having the longest average, non-transaction-specific response time over the last 24 hours are to be instrumented for transaction-specific monitoring. These non-transaction-specific response times may be measured by treating real user hits to specific URLs as implicit transactions.

The transaction-specific performance data collected on colored, agent-based (synthetic) transactions may also be used to select implicit transactions (URLs) to monitor for purposes of monitoring real user activity. This may be accomplished by including logic within the probe—or another appropriate component—that identifies the currently worst performing transactions, and associates these with the URLs to which they correspond. Hits to these URLs may thereafter be treated as implicit transactions that are to be monitored, so that component breakdown data is collected by the probe both for agent-based and real user instances of the relevant transactions.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

What is claimed is:

1. A method of monitoring execution of a transaction that invokes a plurality of application components of an application that runs on an application server, the method comprising:

instrumenting code of each of the plurality of application components to permit execution of each application component to be monitored on the application server;

in response to execution of the instrumented code within a thread, determining whether the thread is part of the transaction; and when the thread is part of the transaction, tracing execution of the thread through each of the plurality of application components to measure an amount of time spent by each such application component on the transaction.

2. The method of claim 1, wherein tracing execution of the thread through each of the plurality of application components comprises recording execution start and stop times of specific methods of the application components.

3. The method of claim 1, wherein determining whether the thread is part of the transaction comprises determining whether an associated transaction request message is colored.

4. The method of claim 1, wherein the transaction is an actual user transaction.

5. The method of claim 1, further comprising monitoring execution of the transaction from a location external to the application server to measure an end-user response time, whereby the method generates data sufficient to assess an impact each of the application components has on transaction performance as seen by end users.

6. The method of claim 1, wherein the application components are J2EE components.

7. The method of claim 1, wherein instrumenting the code of the plurality of application components comprises instrumenting each component as it is loaded into a memory of the application server for execution.

8. The method of claim 7, wherein instrumenting the code of the plurality of application components further comprises using a patched version of a Java Virtual Machine class loader to access said code when application components are loaded.

9. A probe software component that embodies the method of claim 1.

10. The method of claim 1, further comprising, when the thread is not part of the transaction, refraining from tracing execution of the thread through each of the plurality of application components.

11. The method of claim 1, wherein the plurality of components is a subset of a complete set of application components invoked by the transaction, said subset being dependent upon configuration data that specifies which components are to be instrumented for monitoring.

12. A system for selectively monitoring application components on an application server, the system comprising:

an instrumentation component that instruments code of application components to permit execution thereof by the application server to be monitored;

a virtual machine that executes the application components on the application server;

wherein the virtual machine is configured to pass the application components to the instrumentation component for instrumentation prior to execution thereof by the virtual machine, and wherein the instrumentation component selectively instruments the application components received from the virtual machine based on configuration data that specifies which application components are to be instrumented for monitoring.

13. The system of claim 12, wherein the configuration data comprises heuristics for determining which application components are to be instrumented for monitoring.

14. The system of claim 12, further comprising a monitoring component that records execution start and stop times of instrumented application components executed by the virtual machine.

15. The system of claim 14, wherein the monitoring component records said start and stop times in association with specific user transactions to which they correspond, to thereby collect transaction-specific application server performance data.

16. The system of claim 12, wherein the virtual machine comprises a patched class loader class that is configured to pass code of an application component to the instrumentation component when said application component is loaded.

17. The method of claim 12, wherein the configuration data indirectly specifies which application components are to be instrumented for monitoring.

* * * * *

UNITED STATES PATENT AND TRADEMARK OFFICE
CERTIFICATE OF CORRECTION

PATENT NO. : 6,792,460 B2
DATED : September 14, 2004
INVENTOR(S) : Oulu et al.

It is certified that error appears in the above-identified patent and that said Letters Patent is hereby corrected as shown below:

Column 18,
Line 65, after "monitored;" insert -- and --.

Column 20,
Line 11, delete "method" and insert -- system --.

Signed and Sealed this

Twenty-eighth Day of March, 2006

JON W. DUDAS
*Director of the United States Patent and Trademark Office*